F. L. ANTISELL.
PROCESS OF AND APPARATUS FOR EXTRACTING METALS FROM ORES.
APPLICATION FILED JAN. 7, 1915.
1,282,521. Patented Oct. 22, 1918.
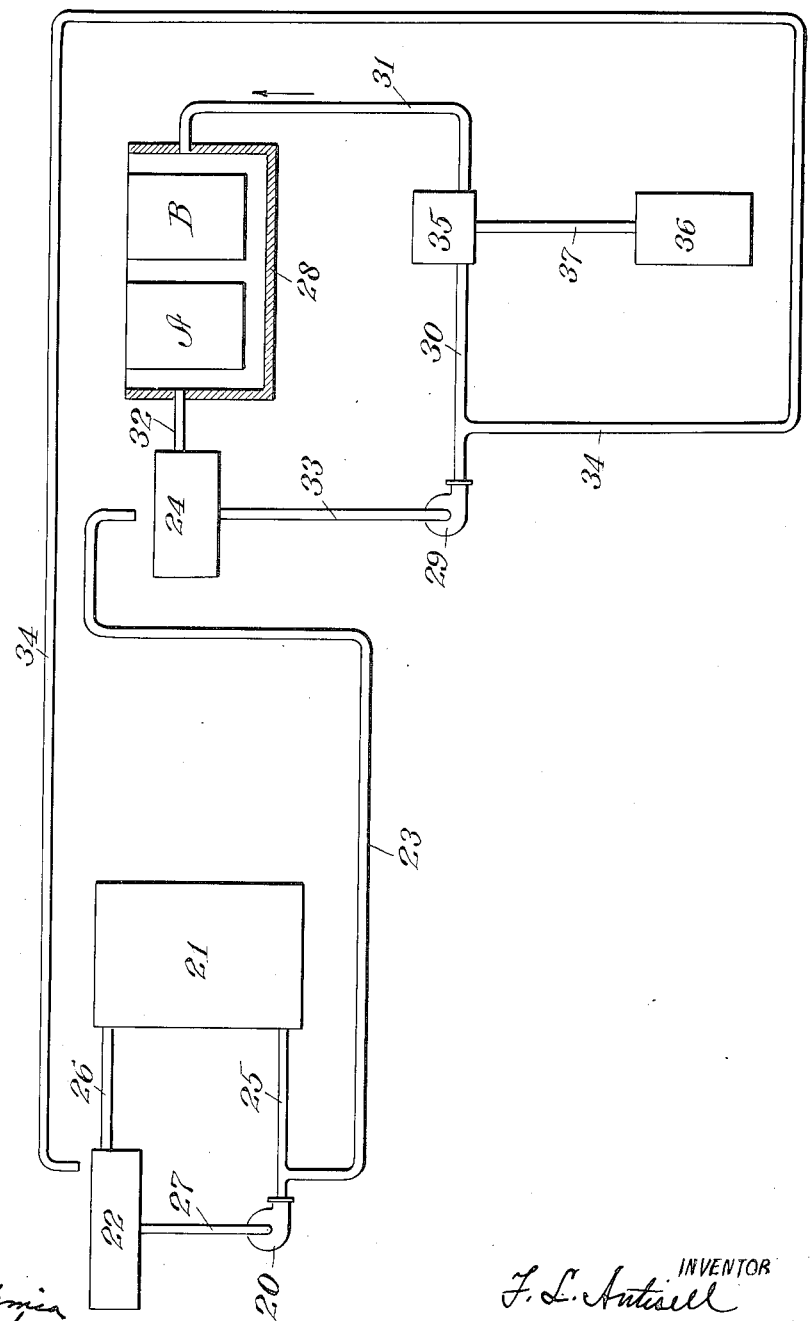

UNITED STATES PATENT OFFICE.

FRANK L. ANTISELL, OF PERTH AMBOY, NEW JERSEY.

PROCESS OF AND APPARATUS FOR EXTRACTING METALS FROM ORES.

1,282,521.   Specification of Letters Patent.   Patented Oct. 22, 1918.

Application filed January 7, 1915. Serial No. 911.

*To all whom it may concern:*

Be it known that I, FRANK L. ANTISELL, a citizen of the United States, residing at Perth Amboy, in the county of Middlesex and State of New Jersey, have invented certain new and useful Improvements in Processes of and Apparatus for Extracting Metals from Ores, of which the following is a specification.

This invention relates to the process of leaching copper ore and electrolytically depositing its metal, and has particular reference to an automatic sequence of operations and chemical reactions, the lixiviant and electrolyte used being in the nature of a solution saturated with impurities, such as Fe—$Al_2O_3$—etc.: thus no further amount of impurities will combine with the acid, and as I regenerate the acid combined with the copper sulfate, there is theoretically no acid consumed unless alkalis are present.

Leaching and precipitating processes may for convenience be divided into two general classes.

First: The leaching of copper ore, recovering the copper from the resulting solution by some displacing agent, such as iron and discarding the resulting solution.

Second: The leaching of copper ore, precipitating the copper electrolytically, thus regenerating the acid so combined with the copper and purifying the solution from time to time and using it in a continuous cycle. The first process is that by which practically all the leached copper is produced. It is very expensive and conditions must be favorable for its operation. In both of the processes mentioned, a large amount of impurities originally contained in the ore will be dissolved by the lixiviant, as well as the copper, thereby consuming a relatively large amount of acid from a pound of copper. As leaching processes are particularly adapted to ores containing a relatively small amount of copper, say from twenty to fifty pounds to the ton, relatively large amounts of ore will necessarily have to be treated to produce a ton of copper. A usual figure is seventy tons of ore and four thousand gallons of lixiviant for each ton of copper produced in a cycle of twenty-four hours. It is self evident that the production of any considerable tonnage of copper per day will result in an enormous amount of ore and solution handled every twenty-four hours. It is self evident therefore; First, that an enormous quantity of impurities present in the ore will be dissolved by the lixiviant for each ton of copper produced. Second: That the solution is contaminated by the impurities and that the large amount of acid is consumed by the impurities. To make this clear, take the following as the analysis of a typical carbonate ore suitable for treating by a lixiviant process:

Cu _____ 1.50%
Fe _____ 5.00%
$Al_2O^3$ _____14 %
CaO _____ .5 %
MgO _____ .8 %
Mn _____ .5 %

All of these constitutents are not soluble in an ordinary lixiviant such as a dilute sulfuric acid solution, but they are soluble to such an extent that for every pound of copper put in solution about five pounds of sulfuric acid (66°B.) will be consumed, 35% of the acid combining with the copper and 65% with the impurities. Furthermore, the lixiviant must be removed from the ore at a specific time, say when 90% of the soluble copper is in solution. If the lixiviant remains in the ore for a longer time, the quantity of acid consumed is greatly increased, and, on the ore which I have just above described the consumption will rise as high as nine or ten pounds per pound of copper dissolved. It is therefore necessary to remove the solution in order to eliminate the possibility of the excess acid consumption which does not permit of as thorough an extraction as desirable, or if the extraction is high, the acid consumption will also be high and thus the acid cost may be more than the value of the copper extracted.

Another disadvantage of the prior process is its intermittent nature. The lixiviant is put on the ore generally in one, two or three leachings and removed as before mentioned, necessitating an undersirable amount of labor and interfering with the continuous process, which, of course, is to be avoided where large tonnage of ore is added.

Another disadvantage is that where electrical precipitation is used for recovering the copper, the solution must be purified from time to time with loss of time and at great expense.

Another disadvantage in the prior art is that where $SO_2$ was used for producing by-product acid and also for increasing the energy efficiency of the system, the results were not satisfactory, for instance, when using lead anodes the anodic efficiency when oxidizing $SO_2$ in practice could not be maintained above 15%. The oxidization of the $SO_2$ was therefore small, resulting in a small by-product acid yield, and by the same law the voltage was but slightly decreased in addition to this objection, the solution was highly charged with $SO_2$ gas which escaped from the tanks and was very detrimental to the health of the tank attendants. Furtherfore, the reactions due to the $SO_2$ invariably reaching the leaching tanks causes trouble, and, if any cupric chlorid were present, the $SO_2$ would precipitate cuprous chlorid in the tails, and thus copper otherwise available, was carried out with the tails.

Again the $SO_2$ when present in the leaching tank necessitates additional operations, otherwise the copper sulfite, being an unstable salt would change to cupro-cupric sulfate and because it was only slightly soluble in water, would precipitate when the tails are washed and thus lost.

The question of using $SO_2$ while theoretically desirable has not been found commercially feasible in an electrolyte heretofore.

The object of my invention is to overcome the disadvantages of the prior art as hereinabove stated.

In carrying out my invention, I use as a lixiviant a dilute acid solution, such as sulfuric acid. This solution is common to both uses, leaching and deposition. I maintain the solution in a condition of saturation, the Cu, Fe, $Al_2O_3$, MgO and Mn tending to form a concentrated solution. By "tending" I mean that at periods the solution is strictly a saturated one, but owing to the fact that a certain proportion of the solution is entrained in the tails, and, therefore, removed with the same, and although the tails are washed and the wash water returns to the system, still, a small portion of the above elements is removed periodically and therefore at times the solution is not strictly saturated, but tending thereto. An approximately saturated solution in grams would be:

| | | |
|---|---|---|
| Cu | 25 | grams per liter |
| Free $H_2SO_4$ | 20 | grams per liter |
| Fe | 30 | grams per liter |
| $Al_2O_3$ | 20 | grams per liter |
| CaO | .50 | grams per liter |
| MgO | .50 | grams per liter |
| Mn | .20 | grams per liter |

I have found that by proper method, using such a solution, a satisfactory commercial cathode can be produced, which by simply melting in a suitable furnace and with a minimum treatment, the castings will have a copper content of 99.93 and an electrical conductivity of 100% or over, the solution used being one saturated with impurities and containing enough ferrous sulfate to act as a depolarizer.

I have illustrated in the accompanying drawings diagrammatically an apparatus for carrying out my process.

The drawing is a diagrammatic view of the apparatus or system for carrying out my process.

On the drawing the part marked 20 represents a pump, 21 a leaching tank to contain the ore to be treated, 22 is a sump for maintaining a constant head and to receive the slimes carried from the leaching tank; 23 is a pipe leading from the said pump to the electrolytic sump 24 for the purpose of transferring the solution richer in copper to that part of the system which is poorer in copper; 25, 26 and 27 are circulating pipes connecting the pump 20, the leaching tank 21 and the sump 22 in circuit. 28 is a suitable electrolytic deposition tank; 29 is a pump for circulating the electrolyte; 30, 31, 32 and 33 are pipes connecting the pump with the tank 28, the tank with the sump 24 and the sump with the said pump; 34 is a pipe connected to the pipe 30 of the electrolytic system and leads to the sump 22 of the leaching system; 35 is a chamber between the pipes 30 and 31 for reducing say ferric sulfate to ferrous sulfate with $SO_2$ gas; 36 is a suitable tank containing a suitable supply of $SO_2$ gas which is transferred to the reducing chamber 35 by the pipe 37. The part marked A is a cathode and B is an anode, both of which are suitably supported and energized in tank 28.

In carrying out the invention, the tank 21 is filled with ore crushed to a suitable fineness. Through this tank by the pump 20, pipes 25, 26 and 27 and the sump 22, I circulate the lixiviant of say dilute sulfuric acid containing about 25 grams of copper to the liter, and saturated with the other impurities which were previously extracted from the ore or added to the lixiviant.

Through this leaching system. I circulate a relatively large amount of solution, say about seventy (70) gallons a minute for every ton of copper produced per day, and through the pipe 23 I transfer about seven (7) gallons of solution a minute. I may here state that when fine ore is used, I prefer an upward circulation in the tank 21. From the electrolytic system by means of pipe 34, about seven (7) gallons of solution per minute is also transferred to the sump 22. I circulate through the electrolytic system by means of the pump 29 through pipes 30 and 31 to tank 28 through pipe 32 and to the sump 24 and from the sump through the pipe 33 back to the pump 29 approximately seven hundred (700) gallons of solution per minute. This high rate of circulation is desirable as conditions change, as it tends to improve the deposit of cathode copper and also tends to depolarize the particular form of anode used. This high rate of circulation, however, can be modified, when desirable, according to conditions. In passing the solution through the electrolytic tank 28, there is a constant tendency to oxidize the iron in the solution at the anode and reduce it at the cathode. By arranging the circulation in a suitable manner and having a direct and rapid flow in front of the cathode and anode, I am enabled to remove from the electrolytic tank the ferric sulfate practically as fast as it is formed, there being comparatively little secondary reaction, that is to say, ferric sulfate produced at the anode reduced to ferrous sulfate at the cathode. The main portion of the solution is transferred through the reducing chamber 35 where a relatively small quantity of ferric sulfate is reduced to ferrous sulfate and sulfuric acid. The acid being obtained from oxidizing the $SO_2$ and from that held as $Fe_2(SO_4)_3$.

It is, of course, apparent that the tank 28 is fitted with a suitable number of anodes and cathodes, for illustration, I have shown only one of each and the circulation inside of the tank is of course arranged to distribute the circulation over the proper number of electrodes.

I maintain the solution as low in $SO_2$ as possible, and I find that a small amount of ferric sulfate is generally present in the electrolyte, but it does not seriously interfere with the efficiency of the process, as in practice, I have found that I am enabled to deposit from the solution from one and one-half (1½) pounds to two (2) pounds of copper per K. W. H.

The advantages of my invention are numerous. With the composition of ore, as stated hereinabove, I am enabled to produce as a by-product all the acid necessary for the lixiviant for the ore and no foreign acid is required to carry on the process. In producing this acid, I also lower the voltage between the anode and cathode by reason of the fact that the heat of formation tends to produce a current in the same direction as is required for the deposition of the copper at the cathode. The process is carried on in a cycle of operation and does not have to be interrupted to add new lixiviant or to remove the solution for purification, the solution remaining in constant circulation throughout the system, and I am therefore enabled to produce a satisfactory deposit of copper or other metal without purifying the solution. I greatly reduce the quantity of acid necessary for extracting a given quantity of copper for the reason that my solution is already saturated with certain elements and the acid will not combine with any further amount of said elements. I am able to effect a more perfect extraction of the copper for the reason that I permit the lixiviant to remain in contact with the ore for a long period without dissolving the additional impurities and therefore can extract the maximum amount of copper without attention. By introducing $SO_2$ in a chamber and reducing therein a part of the ferric sulfate which was formed at the anode, and thus using the ferrous sulfate as the depolarizer, only a very small quantity of $SO_2$ is present, and in quantities that it is not deleterious to the health of the attendants on the plant.

The grade of cathode copper produced is so high that when melted in cast will have copper contents of 99.93%.

I circulate a portion or all of my solution under the influence of the anode and thereby oxidize ferrous to ferric sulfate which is very susceptible of anodic oxidization, much more so than $SO_2$ direct, for instance, in actual operation, an average anodic efficiency of 70% was obtained for a long period of time when oxidizing ferrous sulfate and $SO_2$. While under favorable conditions, when oxidizing the $SO_2$ only, an efficiency of not more than 27% was obtained. By using both ferrous sulfate and $SO_2$, I am enabled to carry out my process with very little $SO_2$ in solution, using preferably an anode constructed of coke.

Having now described my invention, what I claim as new and desire to secure by Letters Patent is:

1. The process for recovering metals from metalliferous materials, which consists in leaching a metalliferous material with a solution saturated with respect to other constituents present in the said material, but capable of dissolving a desired metal therefrom and becoming saturated therewith, continuously electrolyzing a portion of the solution thus obtained to deposit a certain quantity of the desired metal therefrom and again bringing the solution thus impoverished in the desired metal into contact with the metalliferous material, the saturation of the said solution with respect to the said other constituents being constantly maintained.

2. The process for recovering metals from metalliferous materials, which consists in leaching a metalliferous material with a solution saturated with respect to other constituents present in the said material, but capable of dissolving a desired metal therefrom and becoming saturated therewith, continuously electrolyzing a portion of the solution thus obtained to deposit a certain quantity of the desired metal therefrom, adding a depolarizing agent during the electrolysis, and again bringing the solution thus impoverished in the desired metal into contact with the metalliferous material, the saturation of the said solution with respect to the said other constituents being constantly maintained.

3. The process for recovering metals from metalliferous materials, which consists in leaching a metalliferous material in a leaching system with a solution saturated with respect to the impurities present in the said material but capable of dissolving a desired metal therefrom and becoming saturated therewith, continuously removing a portion of the solution saturated with the desired metal from the leaching system to an electrolytic system, electro-depositing a portion of the desired metal contained in the said solution and continuously transferring a portion of the electrolyzed solution back to the leaching system for the purpose of again saturating it with the desired metal, the said solution being maintained in its state of saturation with respect to the said impurities.

4. The process for recovering metals from metalliferous materials, which consists in leaching a metalliferous material in a leaching system with a solution saturated with respect to the impurities present in the said material but capable of dissolving a desired metal therefrom and becoming saturated therewith, continuously removing a portion of the solution saturated with the desired metal from the leaching system to an electrolytic system, electro-depositing a portion of the desired metal contained in the said solution, depolarizing the said solution during the electrolysis and continuously transferring a portion of the electrolyzed solution back to the leaching system for the purpose of again saturating it with the desired metal, the said solution being maintained in its state of saturation with respect to the said impurities.

5. The process for recovering copper from a copper bearing material, which consists in leaching the said material with a solution saturated with respect to other constituents present in the said material, but capable of dissolving copper therefrom and becoming saturated therewith, continuously electrolyzing a portion of the solution thus obtained to deposit a certain quantity of copper therefrom and again bringing the solution thus impoverished in the copper into contact with the copper bearing material, the saturation of the said solution with respect to the said other constituents being constantly maintained.

6. The process for recovering copper from a coper bearing material, which consists in leaching the said material with a solution saturated with respect to other constituents present in the said material, but capable of dissolving copper therefrom and becoming saturated therewith, continuously electrolyzing a portion of the solution thus obtained to deposit a certain quantity of copper therefrom, adding a depolarizing agent during the electrolysis, and again bringing the solution thus impoverished in the copper into contact with the copper bearing material, the saturation of the said solution with respect to the said other constituents being constantly maintained.

7. The process for recovering copper from a copper bearing material, which consists in leaching the said material in a leaching system with a solution saturated with respect to the impurities present in the said material but capable of dissolving copper therefrom and becoming saturated therewith, continuously removing a portion of the solution saturated with copper from the leaching system to an electrolytic system, electro-depositing a portion of the copper contained in the said solution and continuously transferring a portion of the electrolyzed solution back to the leaching system for the purpose of again saturating it with copper, the said solution being maintained in its state of saturation with respect to the said impurities.

8. The process for recovering copper from a copper bearing material, which consists in leaching the said material in a leaching system with a solution saturated with respect to the impurities present in the said material but capable of dissolving copper therefrom and becoming saturated therewith, continuously removing a portion of the solution saturated with copper from the leaching system to an electrolytic system, electro-depositing a portion of the copper contained in the said solution, depolarizing said solution during the electrolysis and continuously transferring a portion of the electrolyzed solution back to the leaching system for the purpose of again saturating it with copper, the said solution being maintained in its state of saturation with respect to the said impurities.

9. The process for recovering copper from copper ore, which consists in leaching the said ore in a leaching system with a solution saturated with respect to the impurities present in the said ore but capable of dissolving copper therefrom and becoming saturated therewith, circulating the leaching solution through the leaching system, continuously removing a portion of the solution saturated with copper from the leaching system to an electrolytic system, electro-depositing a portion of the copper contained in the said solution while circulating it through the electrolytic system at greater speed than through the leaching system, depolarizing said solution during the electrolysis and continuously transferring a portion of the electrolyzed solution back to the leaching system for the purpose of again saturating it with copper, the said solution being maintained in its state of saturation with respect to the said impurities.

10. The process for recovering copper from copper ore, which consists in leaching the said ore in a leaching system with a solution saturated with respect to the impurities present in the said ore but capable of dissolving copper therefrom and becoming saturated therewith, circulating the leaching solution through the leaching system, continuously removing a portion of the solution saturated with copper from the leaching system to an electrolytic system, electro-depositing a portion of the copper contained in the said solution while circulating it through the electrolytic system at greater speed than through the leaching system, introducing sulfurous acid during the electrolysis to depolarize the said solution, and continuously transferring a portion of the electrolyzed solution back to the leaching system for the purpose of again saturating it with copper, the said solution being maintained in its state of saturation with respect to the said impurities.

11. In an apparatus for extracting metals from ore, a leaching tank to contain the ore, a pump, a pipe connecting the pump and tank, at or near its bottom, a sump, a pipe connecting the sump and tank at or near its top, another pipe connecting the sump and pump, and a pipe leading from the pump and communicating with an electrolytic system.

12. In an apparatus for extracting metals from ore, a leaching system consisting of a tank to contain the ore, a pump, pipes to circulate a solution in the system, upwardly through its tank, an electrolytic system consisting of an electrolytic tank, a pump and pipes to circulate the solution through the electrolytic system, a pipe connecting with the pump of the leaching system and communicating with the electrolytic system, and another pipe connecting with the pump in the electrolytic system and communicating with the leaching system.

In witness whereof I have hereunto set my hand at the city, county and State of New York, this sixth day of January, 1915.

FRANK L. ANTISELL.

In presence of—
  W. L. HARPER,
  ISABEL R. RICHARDS.